(12) United States Patent
Li et al.

(10) Patent No.: US 9,654,524 B2
(45) Date of Patent: May 16, 2017

(54) SYSTEM AND METHOD TO CUSTOMIZE A MULTIPOINT CONTROL UNIT

(71) Applicant: Futurewei Technologies Inc., Plano, TX (US)

(72) Inventors: Li Li, Bridgewater, NJ (US); Tao Cai, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 331 days.

(21) Appl. No.: 14/574,085

(22) Filed: Dec. 17, 2014

(65) Prior Publication Data

US 2016/0182575 A1    Jun. 23, 2016

(51) Int. Cl.
  *H04L 29/06* (2006.01)
  *H04L 29/08* (2006.01)
  *H04N 7/15* (2006.01)

(52) U.S. Cl.
  CPC ............ *H04L 65/403* (2013.01); *H04L 67/02* (2013.01); *H04L 67/2842* (2013.01); *H04N 7/152* (2013.01)

(58) Field of Classification Search
  CPC ....... H04N 7/152; H04L 65/403; H04L 67/02; H04L 67/2842
  See application file for complete search history.

(56) References Cited

U.S. PATENT DOCUMENTS

| | | | |
|---|---|---|---|
| 7,010,108 B2 * | 3/2006 | DelHoyo | H04L 45/00 348/219.1 |
| 8,311,197 B2 | 11/2012 | Shaffer et al. | |
| 2004/0165710 A1 * | 8/2004 | DelHoyo | H04L 45/00 379/202.01 |
| 2004/0230655 A1 * | 11/2004 | Li | G06F 17/30056 709/205 |
| 2007/0064901 A1 * | 3/2007 | Baird | H04N 7/15 379/202.01 |
| 2014/0122657 A1 * | 5/2014 | Crawley | H04L 12/1827 709/219 |
| 2016/0249016 A1 * | 8/2016 | Zino | H04N 7/148 |

FOREIGN PATENT DOCUMENTS

| | | |
|---|---|---|
| CN | 101179692 A | 5/2008 |
| CN | 103905664 A | 7/2014 |
| WO | 0237301 A1 | 5/2002 |

OTHER PUBLICATIONS

International Search Report and Written Opinion dated Mar. 14, 2016 in International Patent Application No. PCT/CN2015/097328, 10 pages.

* cited by examiner

*Primary Examiner* — Abdullahi E Salad
(74) *Attorney, Agent, or Firm* — Vierra Megen Marcus LLP

(57) ABSTRACT

Various disclosed embodiments include methods and systems for constructing a multipoint control unit (MCU). The method includes generating an abstract multipoint control unit (MCU) process at an electronic device, the abstract MCU process comprising an identification of MCU resources for instantiating the abstract MCU process. The method includes transmitting, from the electronic device, the abstract MCU process to a server, and receiving, from the server in response to the transmitted abstract MCU process, a concrete MCU process at the electronic device, the concrete MCU process comprising the identified plurality of MCU resources.

19 Claims, 11 Drawing Sheets

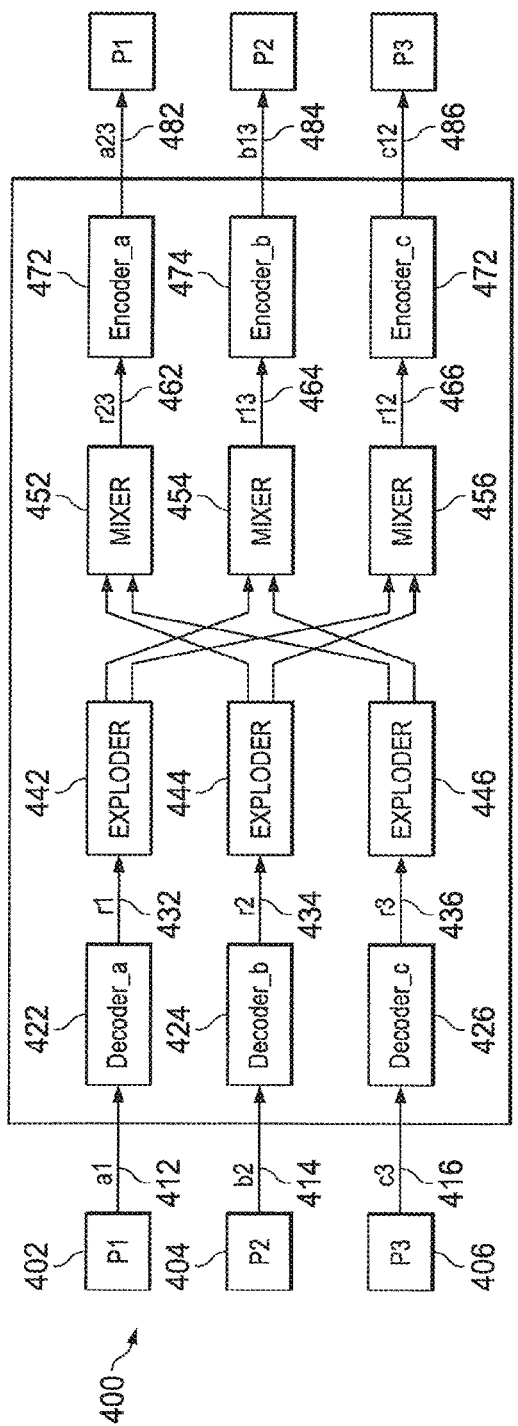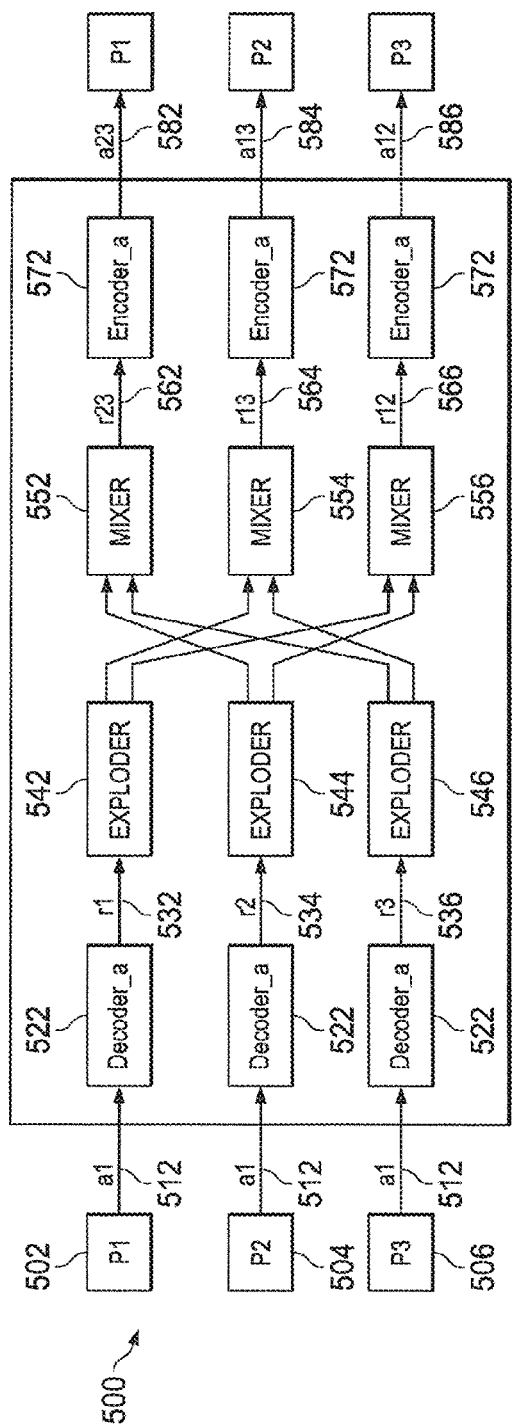

| | 1300 | | | |
|---|---|---|---|---|
| MEDIA TYPE/ FUNCTION | EXPLODE (1310) | MERGE SAME SOURCE (1320) | MERGE DIFFERENT SOURCES (1330) | TRANSLATE (1340) |
| RAW (UNCOMPRESSED) (1302) | √ | | √ (MIXER) | √ |
| CODE (COMPRESSED) (1304) | √ | √ (BUNDLE) | √ (MULTIPLEXER) | √ (TRANSCODER) |
| PACKET (TRANSPORT, e.g., RTP) (1306) | √ | √ | √ | √ (BRIDGE) |

FIG. 13

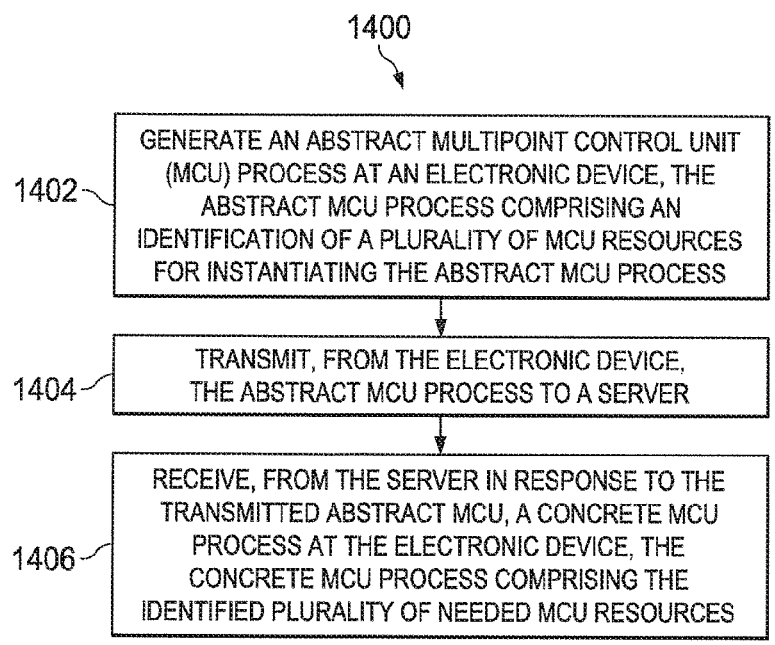

1402 — GENERATE AN ABSTRACT MULTIPOINT CONTROL UNIT (MCU) PROCESS AT AN ELECTRONIC DEVICE, THE ABSTRACT MCU PROCESS COMPRISING AN IDENTIFICATION OF A PLURALITY OF MCU RESOURCES FOR INSTANTIATING THE ABSTRACT MCU PROCESS

1404 — TRANSMIT, FROM THE ELECTRONIC DEVICE, THE ABSTRACT MCU PROCESS TO A SERVER

1406 — RECEIVE, FROM THE SERVER IN RESPONSE TO THE TRANSMITTED ABSTRACT MCU, A CONCRETE MCU PROCESS AT THE ELECTRONIC DEVICE, THE CONCRETE MCU PROCESS COMPRISING THE IDENTIFIED PLURALITY OF NEEDED MCU RESOURCES

FIG. 14

SYSTEM AND METHOD TO CUSTOMIZE A MULTIPOINT CONTROL UNIT

TECHNICAL FIELD

The present disclosure relates generally to a multipoint control unit (MCU), and more particularly to a system and method of customizing an MCU.

BACKGROUND

An MCU is a device commonly used to bridge multiparty audio/video conferences to connect and process multiple real-time media streams. One challenge that exists with MCUs includes the difficulty in changing MCU topology (e.g., how the MCU is connected in the network). Another challenge that exists includes the difficulty in changing a media process at runtime (e.g., supporting an audio conference with three parties, where the three parties do not have a common audio codec inside the MCU). Another challenge that exists includes the difficulty in adding new media functions, such as automatic speech recognition, automatic face recognition, etc. during the audio/video conference. Yet another challenge is the difficulty in accessing the core functions within the MCU (e.g., the core media functions inside the MCU are fixed—one size fits all).

The present disclosure provides various systems and methods to customize an MCU.

SUMMARY

According to one embodiment, there is provided a method for constructing a multipoint control unit (MCU). The method includes generating an abstract multipoint control unit (MCU) process at an electronic device, the abstract MCU process comprising an identification of a plurality of MCU resources for instantiating the abstract MCU process; transmitting, from the electronic device, the abstract MCU process to a server; and receiving, from the server in response to the transmitted abstract MCU process, a concrete MCU process at the electronic device, the concrete MCU process comprising the identified plurality of MCU resources.

In another embodiment, there is provided an apparatus for constructing a multipoint control unit (MCU). The apparatus comprises a processor and memory coupled to the processor. The apparatus is configured to generate an abstract multipoint control unit (MCU) process by a web browser of the apparatus, the abstract MCU process comprising MCU resources that will be needed to instantiate the abstract MCU process; and receive a concrete MCU process by the web browser of the apparatus, the concrete MCU process comprising the needed MCU resources.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 4 illustrates a diagram of a system illustrating an example of an MCU process customization according to one embodiment;

FIG. 5 illustrates a diagram of a system illustrating another example of an MCU process customization according to one embodiment;

FIG. 13 illustrates an example of a table that may be used to describe services and functions of MCU components according to one embodiment; and FIG. 14 illustrates a flow diagram illustrating a method of customizing an MCU process according to one embodiment.

DETAILED DESCRIPTION

Figure 1:
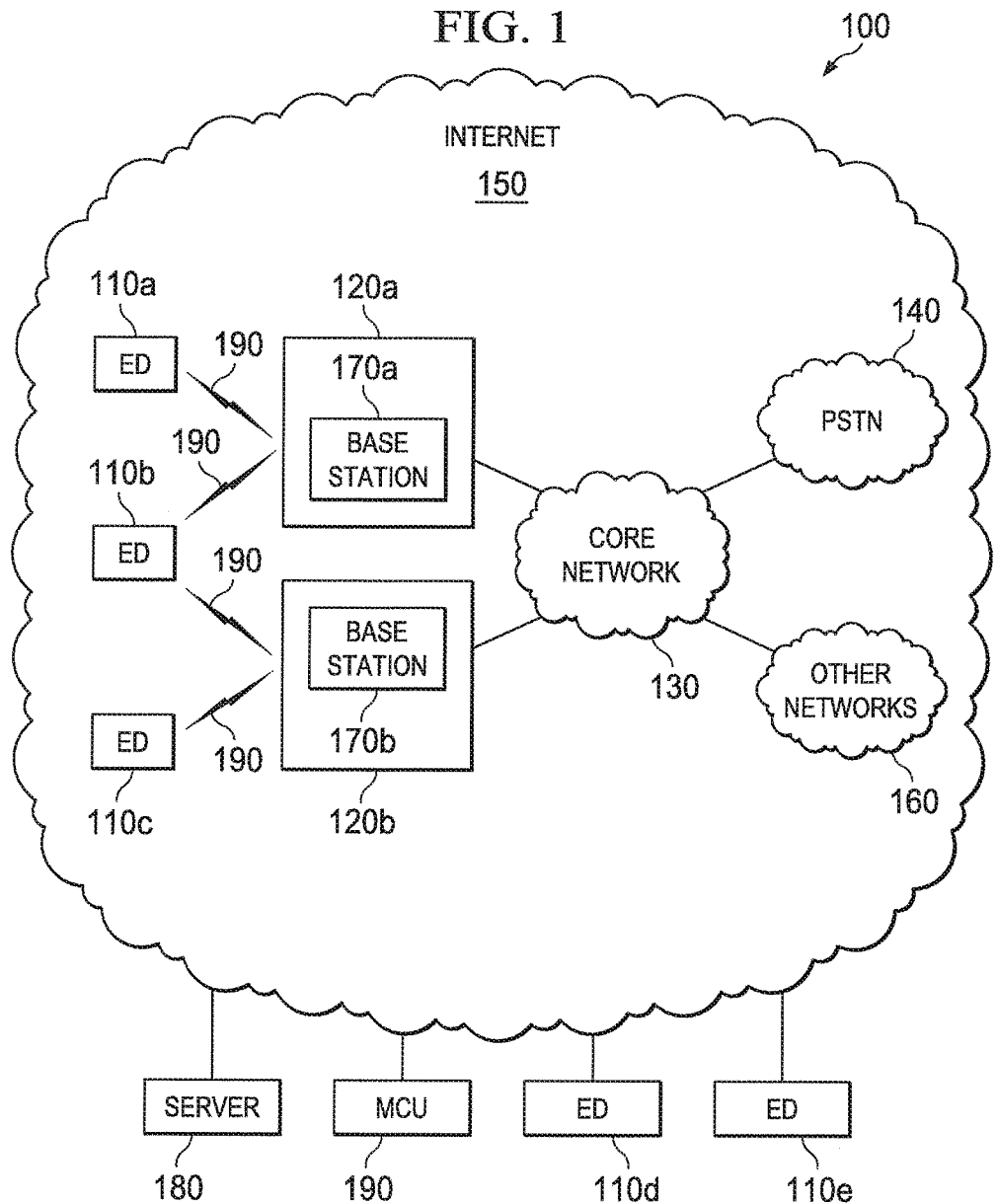
FIG. 1 illustrates a diagram of an illustrative communication system that can implement a customized multipoint control unit (MCU) according to one embodiment.

FIG. 1 illustrates an example communication system 100 that can implement a customized multipoint control unit (MCU). In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110e, radio access networks (RANs) 120a-120b, a core network 130, a public switched telephone network (PSTN) 140, the Internet 150, and other networks 160, one or more servers 180, and one or more multipoint control units 190. While certain numbers of these components or elements are shown in FIG. 1, any number of these components or elements may be included in the system 100.

The EDs 110a-110e are configured to operate and/or communicate in the system 100. For example, the EDs 110a-110e are configured to transmit and/or receive via wireless or wired communication channels. Each ED 110a-110e represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device, all which include and incorporate a browser application.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. EDs 110d-110e are configured to interface and communicate with the internet 150 and may access the core network 130, the PSTN 140, and/or the other networks 160, which may include communicating with the server 180 and the MCU 190.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
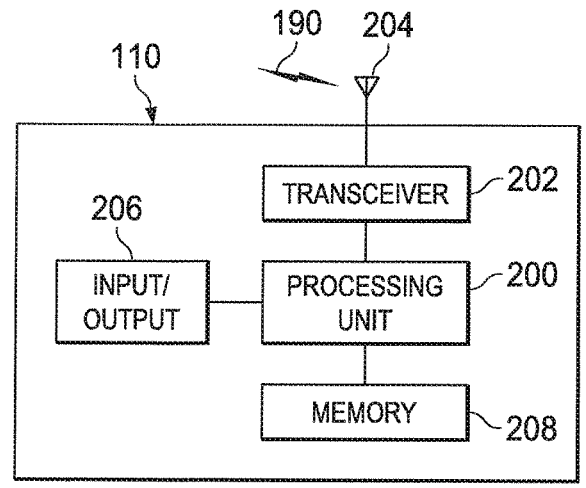
FIGS. 2A and 2B illustrate example devices that can implement a customized MCU according to one embodiment.
Figure 2B:
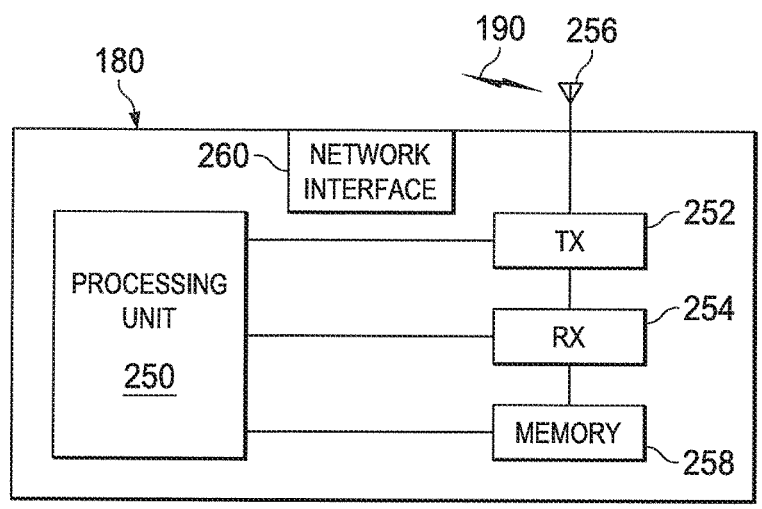

FIGS. 2A and 2B illustrate example devices that may implement the methods and teachings according to this disclosure. In particular, FIG. 2A illustrates an example ED 110, and FIG. 2B illustrates an example server 190. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the server 180 includes at least one processing unit 250, at least one transmitter 252, at least one receiver 254, one or more antennas 256, one or more wired network interfaces 260, and at least one memory 258. The processing unit 250 implements various processing operations of the server 180, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding EDs 110 and server 180 are known to those of skill in the art. As such, these details are omitted here for clarity.

Figure 3:
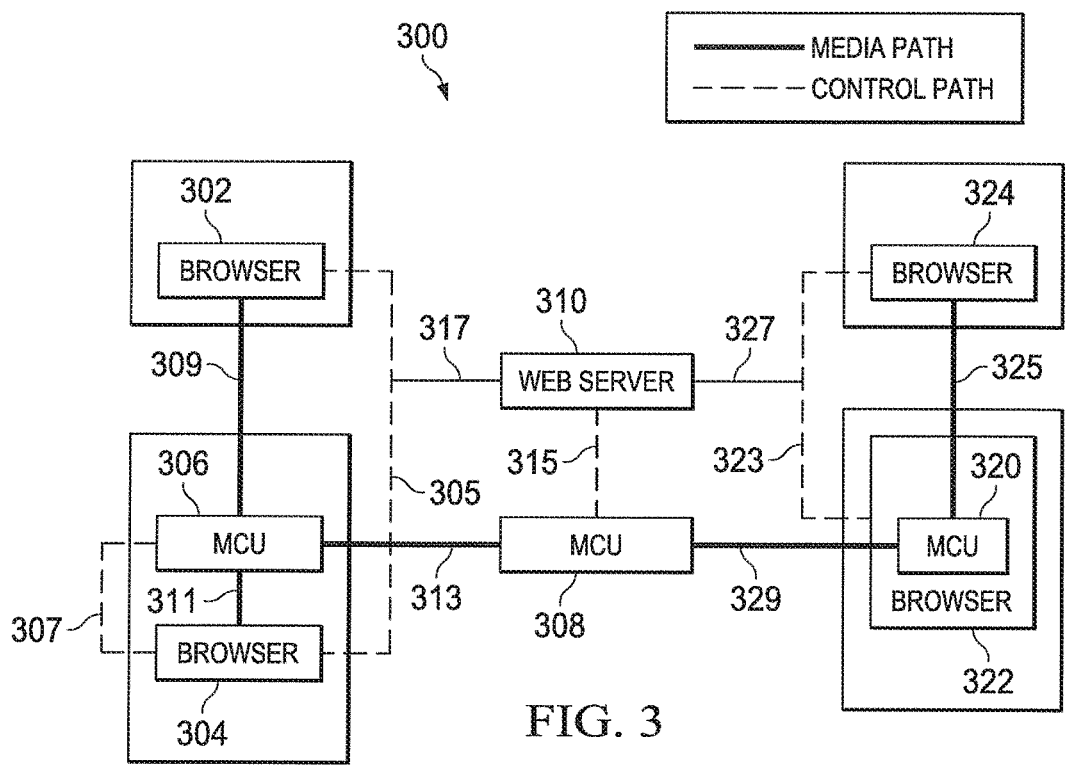
FIG. 3 illustrates high level system architectures of MCU network customization.

Turning to FIG. 3, high level system architectures 300 are shown that illustrate exemplary embodiments of customized MCUs in a multi-party conference. According to one embodiment, an architecture illustrates a first MCU 306 that operates as a separate process under the control of a browser 304 through control path 307 and processes media from browser 302 through media path 309, media from browser 304 through media path 311, and media from an MCU 308 through media path 313. A second MCU 329 operates as a separate server under the control of a web server 310 through control path 315 and processes media from MCU 306 through media path 313 and media from MCU 320 through media path 329. A third MCU 320 operates as a component of a browser 322 and processes media from MCU 308 through media path 329, media from browser 322 through internal media path, and media from a browser 324 through media path 325. Browsers 302, 304, 322 and 324 are also under the control of a web server 310 that manages the conference through control paths 305, 317, 323 and 327.

FIG. 4 is a block diagram of a system 400 illustrating an example of an MCU process customization where three participants (i.e., first participant P1 402, second participant P2 404, and third participant P3 406) that do not share, or do not have, a common audio codec are engaged in an audio conference. Each of the participants 402, 404, 406 is associated with an endpoint that connects to the MCU. Each of the participants 402, 404, 406 is associated with a media stream that is processed by components within the MCU. For example, the first participant P1 402 is associated with a first media stream a1 412, the second participant P2 404 is associated with a second media stream b1 414, and the third participant P3 406 is associated with a third media stream c1 416. In the illustrated embodiment, the first, second and third media streams 412, 414, 416 are audio streams. As illustrated, because the three participants 402, 404, 406 do not have a common audio codec, three different types of encoder and three different types of decoder are needed.

For example, a first decoder 422 is configured to decode the first media stream a1 412 to generate a first decoded media stream r1 432, a second decoder 424 is configured to decode the second media stream b1 414 to generate a second decoded media stream r2 434, and a third decoder 426 is configured to decode the third media stream c1 416 to generate a third decoded media stream r3 436. A first exploder 442 is configured to forward the first decoded media stream r1 432 to a second mixer 454 and a third mixer 456. A second exploder 444 is configured to forward the second decoded media stream r2 434 to a first mixer 452 and the third mixer 456. A third exploder 446 is configured to forward the third decoded media stream r3 436 to the first mixer 452 and the second mixer 454.

Each of the mixers 452, 454, 456 is configured to mix streams together and generate a corresponding mixed stream. For example, the first mixer 452 is configured to mix streams together and generate a first mixed stream r23 462, the second mixer 454 is configured to mix streams together and generate a second mixed stream r13 464, and the third mixer 456 is configured to mix streams together and generate a third mixed stream r12 466.

A first encoder 472 is configured to encode the first mixed stream 462 and generate a first encoded stream a23 482 that is sent back to the first participant P1 402. A second encoder 474 is configured to encode the second mixed stream 464 and generate a second encoded stream b13 484 that is sent back to the second participant P2 404. A third encoder 476 is configured to encode the third mixed stream 466 and generate a third encoded stream c12 486 that is sent back to the third participant P3 406.

FIG. 5 is a block diagram of a system 500 illustrating an example of an MCU process customization where three participants (i.e., first participant P1 502, second participant P2 504, and third participant P3 506) share audio codecs and are engaged in an audio conference. In this example, only one decoder and one encoder are needed as opposed to the three decoders and three encoders needed in the example illustrated in FIG. 4, resulting in reduced network and memory requirements.

Each of the participants 502, 504, 506 is associated with an endpoint that connects to the MCU. Each of the participants 502, 504, 506 is associated with a media stream that is processed by components within the MCU. For example, the first participant P1 502 is associated with a first media stream a1 512, the second participant P2 504 is associated with the first media stream a1 512, and the third participant P3 506 is associated with the first media stream a1 512. In the illustrated embodiment, the first media stream a1 512 is an audio stream.

A decoder 522 is configured to decode the first media stream a1 512 to generate a first decoded media stream r1 532, to generate a second decoded media stream r2 534, and to generate a third decoded media stream r3 536. A first exploder 542 is configured to forward the first decoded media stream r1 532 to a second mixer 554 and a third mixer 556. A second exploder 544 is configured to forward the second decoded media stream r2 534 to a first mixer 552 and the third mixer 556. A third exploder 546 is configured to forward the third decoded media stream r3 536 to the first mixer 552 and the second mixer 554.

Each of the mixers 552, 554, 556 is configured to mix streams together and generate a corresponding mixed stream. For example, the first mixer 552 is configured to mix streams together and generate a first mixed stream r23 562, the second mixer 554 is configured to mix streams together and generate a second mixed stream r13 564, and the third mixer 556 is configured to mix streams together and generate a third mixed stream r12 566.

An encoder 572 is configured to encode the first mixed stream 562 and generate a first encoded stream a23 582 that is sent back to the first participant P1 502. The encoder 572 is configured to encode the second mixed stream 564 and generate a second encoded stream a13 584 that is sent back to the second participant P2 504. The encoder 572 is configured to encode the third mixed stream 566 and generate a third encoded stream a12 586 that is sent back to the third participant P3 506.

Figure 6:
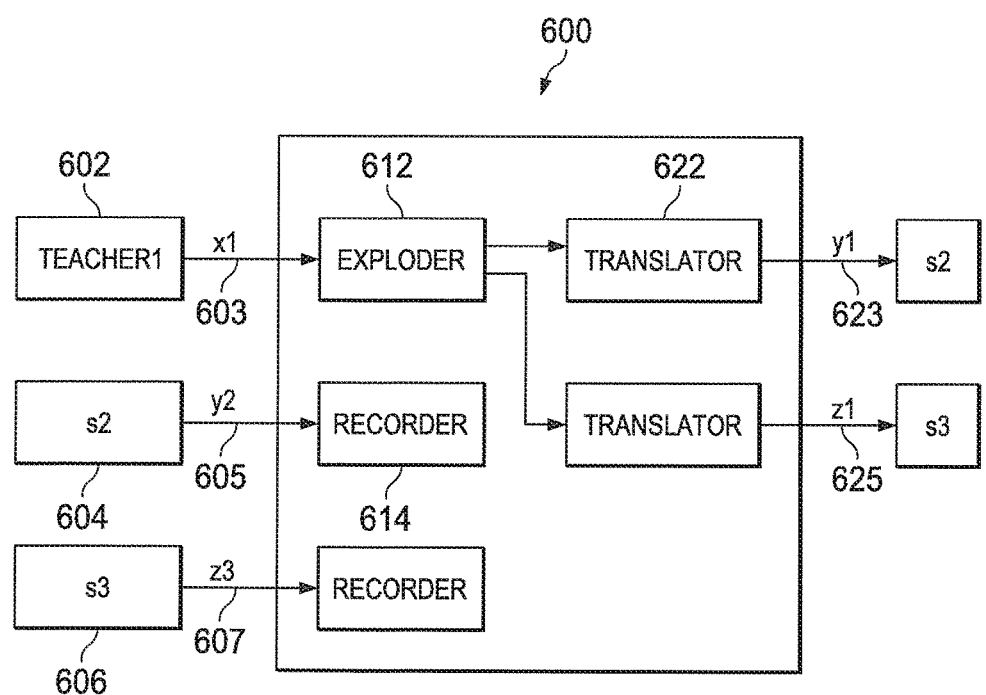
FIG. 6 illustrates a diagram of a system illustrating yet another example of an MCU process customization according to one embodiment.

FIG. 6 is a block diagram of a system 600 illustrating an example of an MCU process development or customization in a scenario in which three participants might be engaged in an audio lecture conference, where the lecturer's speech needs to be translated, and where one or more of the other participants wishes to record private audio notes. This exemplary embodiment illustrates the construction of an MCU process, including defining the process and identifying the different resources/components to be utilized in the process, and how they will be connected together to implement the defined MCU process. The function (i.e., service)

of a media processing resource can be described by an XML language as described by the illustrative examples below of various media processing resources, such as a selector resource, a multicast resource, a switch resource, etc.

As an illustrative example, the three participants may be a teacher 602, a first student 604, and a second student 606. To support this application, some of the components incorporated within the MCU are different as compared to those components incorporated and described above with respect to FIGS. 4 and 5. For example, one or more translators 622 may be included if the audio stream of the teacher 602 is to be translated. In addition, one or more recorders 614 may be included if the first student 604 and/or the second student 606 desires to record private audio notes related to the teacher's lecture.

For example, an exploder 612 is configured to receive an audio stream 603 from the teacher 602 and to forward the received audio stream 603 to one or more translators 622. Each translator 622 is configured to translate the forwarded audio stream and to generate a respective translated audio stream (e.g., translated audio streams 623 and 625) that is sent back to the corresponding participant (e.g., the first student 604 and a second student 606). One or more recorders 614 are configured to receive an audio stream 605, 607 from a respective student 604, 606 if the first student 604 and/or the second student 606 desires to record private audio notes related to the teacher's lecture.

In order to perform MCU customization as described above with respect to FIGS. 4-6, the present disclosure describes a web-based system that allows users to dynamically search for and identify one or more MCU components on the web and then assemble or incorporate the identified components into the MCU as desired. For example, a first XML language may describe a configuration of the MCU (e.g., define what resources/components are required or desired) and how to connect the resources/components together. It may be beneficial for the user to be able to modify the configuration of the MCU as user requirements change. As such, the first XML language may describe modifications to the MCU process. In addition, a second XML language may describe MCU resources on the web so that an MCU process can search for and identify the best matched MCU resources for insertion within the MCU. In other words, the components on the web should be described in a way so that a determination can be made as to whether they match the components the user desires. Web browsers and web servers can be utilized to support the customization process for the user to dynamically define the MCU process, search for the best matched MCU resources, and load/assemble the matched resources into the defined process for execution in the resulting assembled MCU. Although an XML language is referenced above, it will be appreciated that other alternatives, such as JavaScript Object Notation (JSON), may be utilized.

Figure 7:
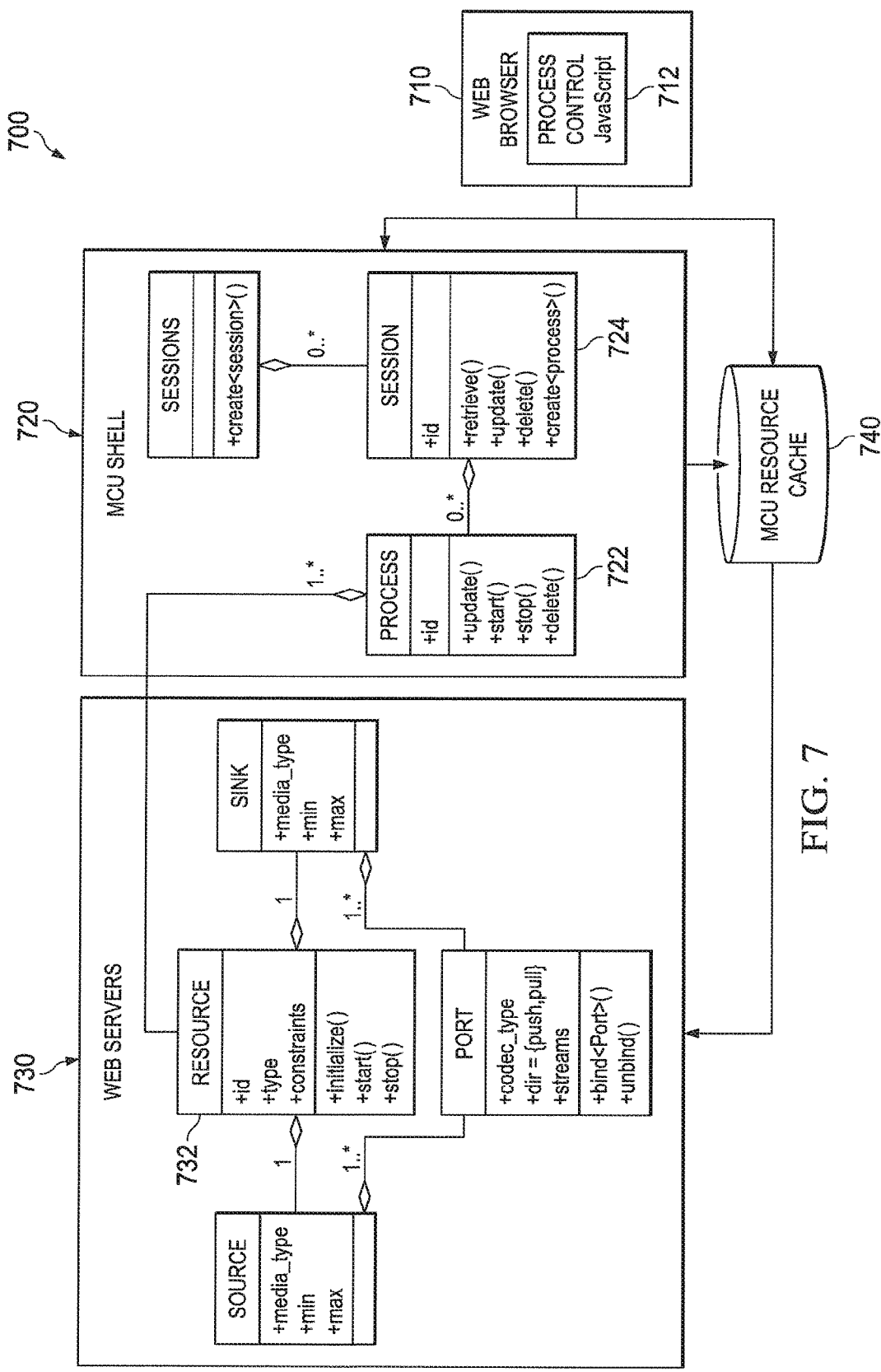
FIG. 7 illustrates a diagram of an MCU customization architecture according to one embodiment.

FIG. 7 illustrates an MCU customization architecture 700 including a web browser 710, an MCU shell 720, one or more web servers 730, and an MCU resource cache 740. The web browser 710 is configured to create an MCU media process and deploy it through the MCU shell 720. For example, during operation, a process control module 712 in the web browser 710 may be configured to enable a user to create an MCU process 722 using an XML language. The MCU process 722 is illustrated as being within the MCU shell 720. The MCU process 722 is run within a session 724 of the MCU shell 720. The MCU process 722 is made up of a number of resources. The resources are the media components needed to instantiate the MCU process.

To illustrate, the web browser 710 can create an MCU media process and deploy it through the MCU shell 720. The user uses the web browser to define the process and to define the media components within the process. Thereafter, the web server 730 searches for the matched components for that process and the web server 730 will download the matched components to the MCU resource cache 740 for deployment to the MCU shell 720. The web browser 710 may use the Representational State Transfer Application Programming Interface (REST API) of the MCU shell 720 to create and update MCU processes using the MCU resources in the MCU resource cache 740.

Figure 8:
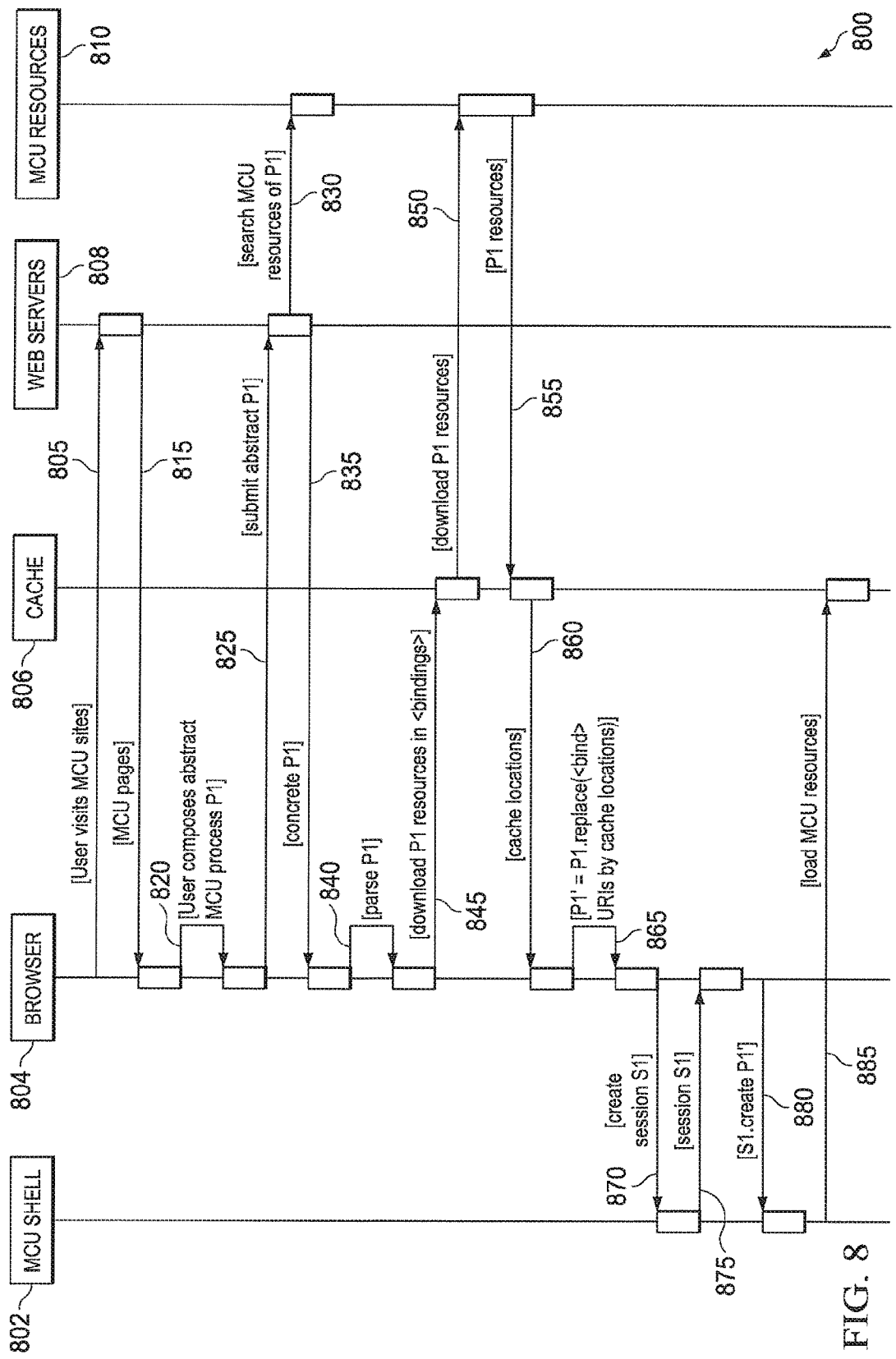
FIG. 8 illustrates a flow diagram illustrating a method of creating an MCU process according to one embodiment.

Now turning to FIG. 8, there is illustrated a process 800 for generating an MCU process in accordance with one embodiment of the present disclosure. As shown, the process 800 is implemented among various devices or components, including an MCU shell 802, a browser 804, a cache 806, one or more web servers 808, and MCU resources 810. In a particular embodiment, the MCU shell 802 may correspond to the MCU shell 720, the browser 804 may correspond to the web browser 710, the cache 806 may correspond to the MCU resource cache 740, each of the one or more web servers 808 may correspond to the web servers 730, and the MCU resources 810 may correspond to the MCU resources 732 (all as shown in FIG. 7).

According to the present disclosure, during operation a user of an electronic device opens the browser 804 and connects to an MCU website (step 805) hosted by the web server 808 and retrieves MCU pages (step 815) from the web server 808 that are related to the MCU. In a particular embodiment, the MCU website may be a website dedicated to MCU customization.

Thereafter, the user may compose an abstract MCU process (step 820) via the browser 804. For example, the user may determine that he/she needs media components that include three decoders, three exploders, three mixers, and three encoders, may indicate how these media components are connected to each other and/or to the MCU, and may indicate such through a graphic interface. Once the media components are defined or identified, the user submits the abstract MCU process (e.g., abstract P1) to the web server 808 (step 825). With that information, the web server 808 searches for and identifies the requested resources or media components (e.g., MCU resources 810) for the process p1 (step 830) and returns the requested resources with the process (e.g., concrete process P1) to the browser 804 (step 835).

As will be appreciated, the main difference between an abstract process and a concrete process is that an abstract process does not have a resource association whereas a concrete process has a resource association.

Thereafter, the browser 804 may parse the concrete process P1 (step 840) to determine concrete resource associations and download the needed resources into the cache 806 (step 845). If the required resources are not already in the cache 806, then the needed resources are downloaded via the MCU resources 810 to the cache (steps 850 and 855) and the cache locations of the needed resources are provided to the browser 804 (step 860).

At this point, there exists a process with the resources downloaded into the cache 806 and the browser 804 is ready to deploy the concrete process to the MCU shell 802. The browser 804 receives the concrete process P1 and replaces the location of the concrete resources to have them pointing to the cache rather than pointing to the original web server 808 (step 865) (e.g., [P1'=P1.replace(<bind>URIs by cache locations)]) because the locations have already been downloaded from the original web server 808 to the cache 806. Thereafter, the browser 804 generates a session with the MCU shell 802 to separate the different processes (steps 870 and 875) and then the concrete process whose resources are cached (e.g., process P1') is sent to the MCU shell (step 880) and then the MCU shell 802 will begin to load the MCU resources from the cache 806 (step 885).

Figure 9:
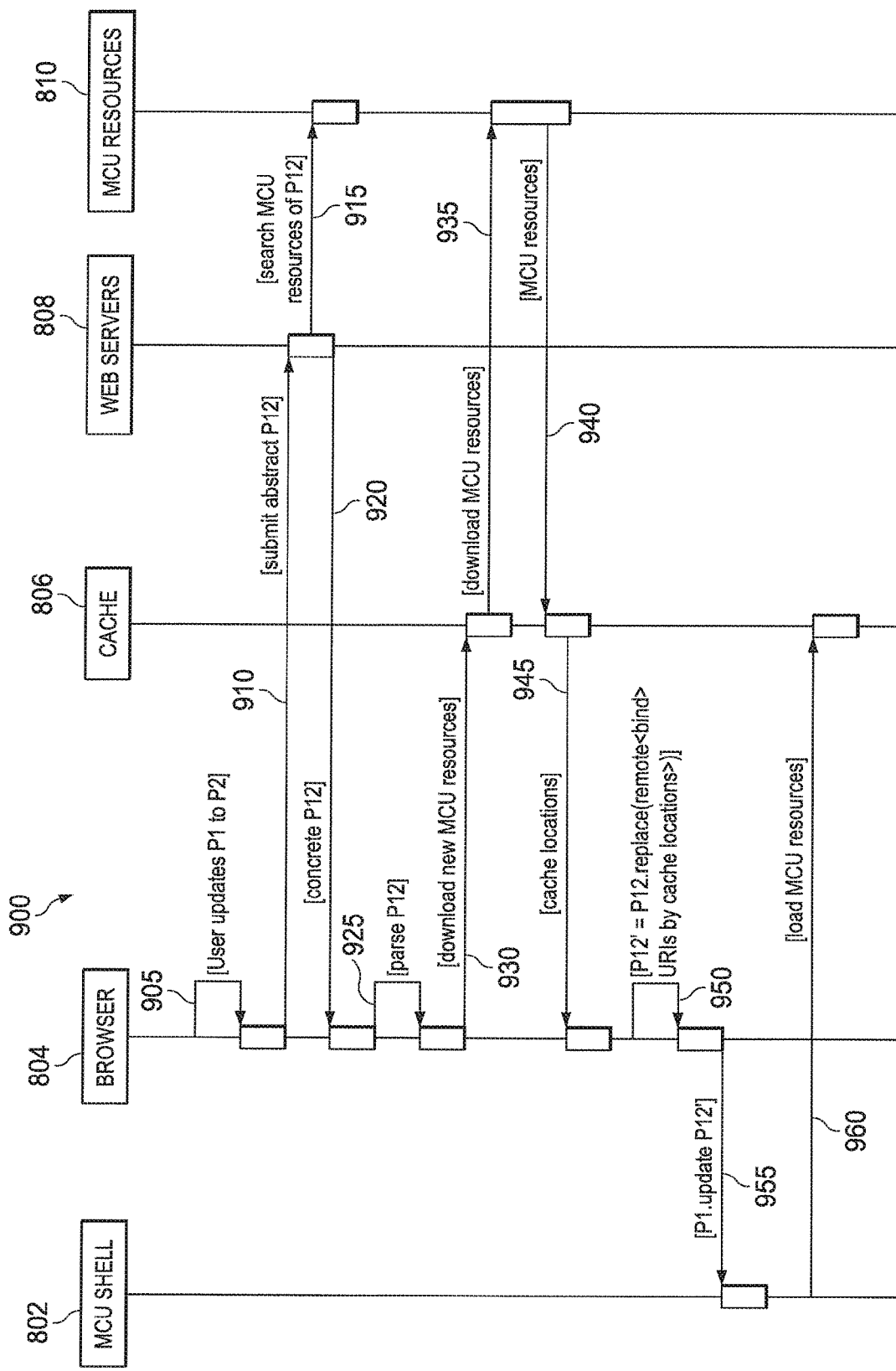
FIG. 9 illustrates a flow diagram illustrating a method of updating an MCU process according to one embodiment.

FIG. 9 illustrates a flow diagram 900 illustrating a method for updating a multipoint control unit (MCU) process after it has been generated in accordance with one embodiment of the present disclosure. Updating an MCU process after the MCU process has been generated may be beneficial because the user may change the application and may desire to deploy that change to an MCU process in real time. The flow diagram 900 includes the MCU shell 802, the browser 804, the cache 806, the one or more web servers 808, and the MCU resources 810.

According to the present disclosure, during operation a user of an electronic device opens the browser 804 to update a first MCU process (e.g., process P1) to a second MCU process (e.g., process P2) (step 905). Thereafter, the user may compose an abstract MCU process via the browser 804. In a particular implementation, the abstract MCU process may comprise a difference between the first process P1 and the second process P2 (e.g., "abstract P12") and the abstract MCU process P12 may be submitted to the web server 808 (step 910). With that information, the web server 808 searches the MCU resources 810 for the resources needed by MCU process P12 (step 915). Once the web server 808 finds the needed resources, the web server 808 returns the needed resources with the process (e.g., concrete process P12) to the browser 804 (step 920).

Thereafter, the browser 804 may parse the concrete process P12 (step 925) to determine concrete resource associations and thereafter download the needed resources into the cache 806 (step 930). If the required resources are not already in the cache 806, then these resources are downloaded via the MCU resources 810 to the cache (steps 935 and 940) and the cache locations are provided to the browser 804 (step 945).

After the process with the resources has been downloaded into the cache 806, the browser 804 receives the concrete process P12 and replaces the location of the concrete resources to have them pointing to the cache rather than pointing to the original web server 808 (step 950) (e.g., [P12'=P12.replace(remote<bind>URIs by cache locations)] because the locations have already been downloaded from the original web server 808 to the cache 806. Thereafter, the browser 804 sends an update command to the MCU shell 802 (e.g., [P1.updateP12']) and then the updated concrete process whose resources are cached (e.g., process P12') is sent to the MCU shell (step 955). Thereafter, the MCU shell 802 will begin to load the MCU resources from the cache 806 (step 960).

Figure 10:
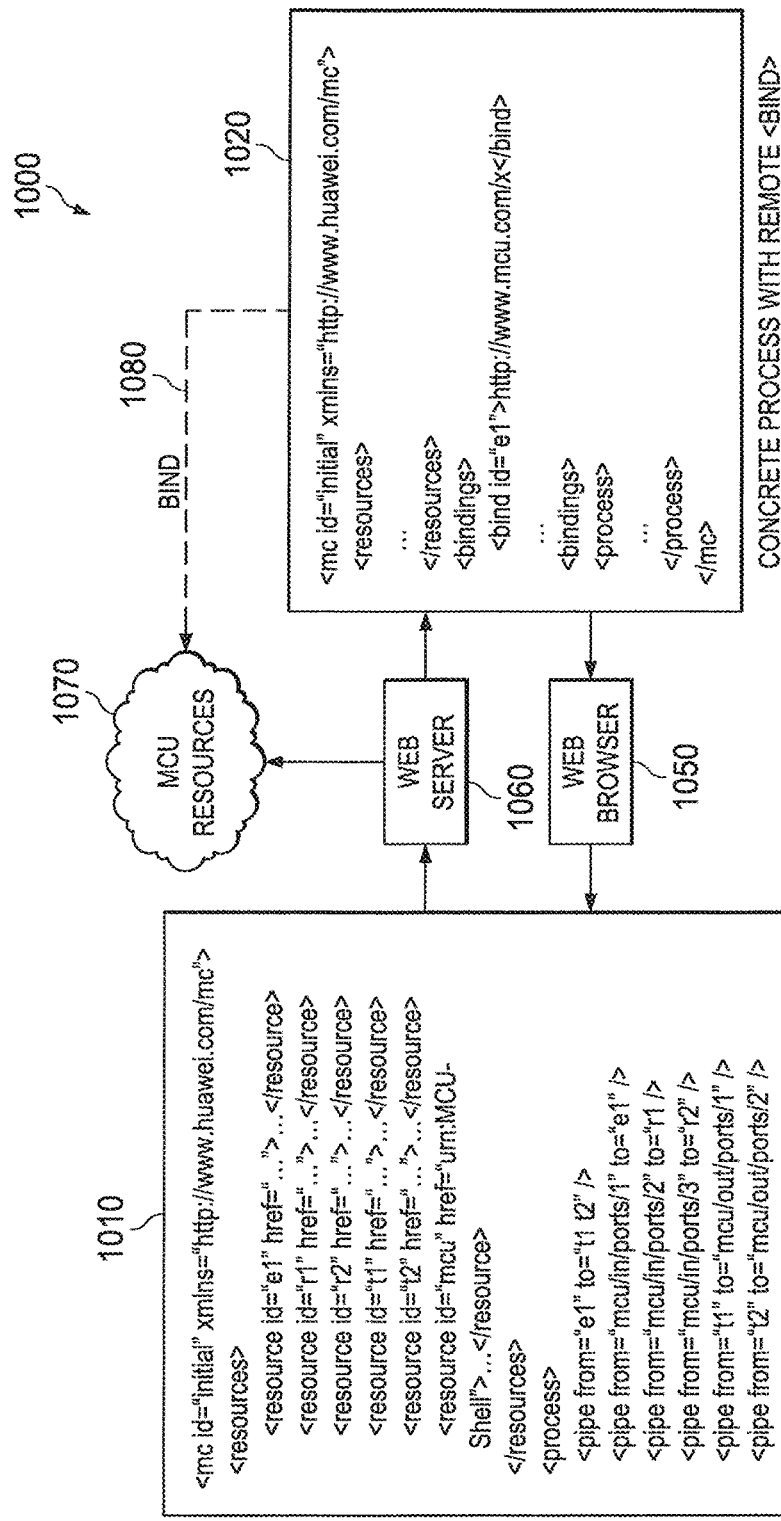
FIG. 10 illustrates an example of composing an MCU process in XML according to one embodiment.

FIG. 10 illustrates an example of composing an abstract MCU process 1010 in XML and a concrete MCU process 1020 in XML. In general, an MCU process comprises two portions or parts. A first part declares what resources each process requires, which are defined in the <resources> element, and a second part declares how the resources are connected together, which is defined in a <pipe> element in this example. For example, as illustrated, a resource "e1" is defined in the <resources> element as <resource id="e1" href=" . . . "> . . . </resource>; a resource "r1" is defined in the <resources> element as <resource id="r1" href=" . . . "> . . . </resource>; etc. The href attributes of <resource> elements link to resources description XML as described in further detail below.

The <pipe> element makes 1-to-n or n-to-1 connections between resources. Assuming that the user wants the resource "e1" connected to both resource "t1" and to resource "t2", then as illustrated, the connection between resource "e1" and the resources "t1" and "t2" is defined as <pipe from="e1" to="t1 t2"/>. If an input to the MCU is to be connected to the resource "e1", then as illustrated, the connection between the input and the resource "e1" is defined as <pipe from="mcu/in/ports/1" to="e1"/>. Similarly, if an input to the MCU is to be connected to the resource "r1", then as illustrated, the connection between the input and the resource "r1" is defined as <pipe from="mcu/in/ports/2" to="r1"/>; etc.

During operation, the user composes the abstract process 1010 via the web browser 1050 and sends the abstract process 1010 to the web server 1060. Thereafter, the web server 1060 searches the repository (e.g., MCU resources 1070) and finds the resources, adds the bindings 1080 to the found resources, and then sends the resources with the bindings back to the web browser 1050 (e.g., the concrete process 1020).

Figure 11:
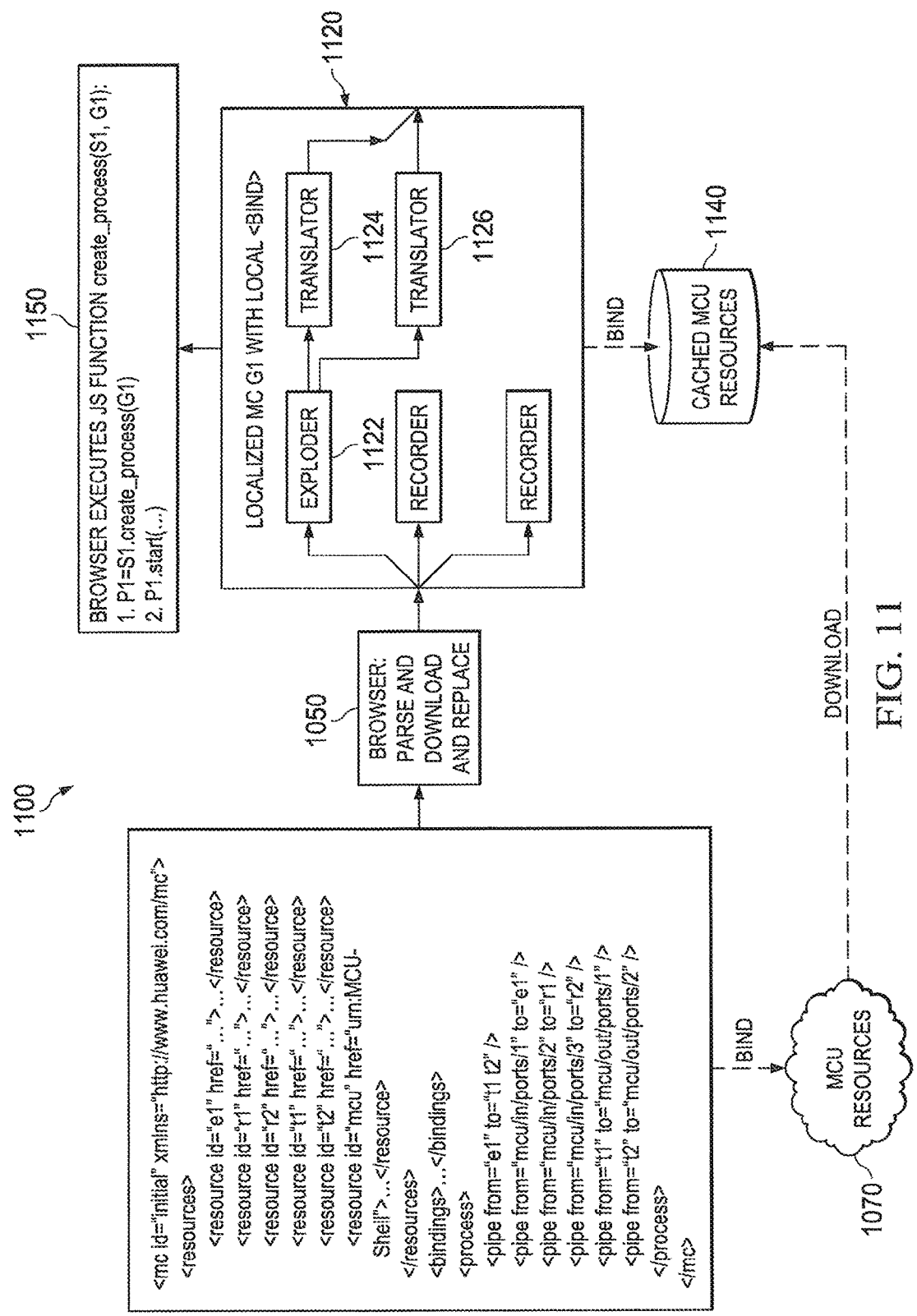
FIG. 11 illustrates an example of creating an MCU process from XML according to one embodiment.

FIG. 11 illustrates an example of creating an MCU process from XML. It is assumed at this point that a concrete process has been generated with resources defined, with bindings defined, and with process defined (e.g., XML document 1110). Thereafter, the browser 1050 receives the XML document 1110, parses the XML document 1110, tries to find matching resources, and downloads the concrete resources (e.g., encoder, decoder, exploder, recorder, etc.) from the web. The resources are downloaded into the MCU cache 1140 from the repository (e.g., MCU resources 1070). Once the download succeeds, the browser 1050 executes a Java script function 1150 to create these processes with the MCU shell 1120. For example, the exploder 1122 in the MCU shell 1120 corresponds to the resource "e1" in the XML document 1110. Similarly, the translator 1124 in the MCU shell 1120 corresponds to the resource "t1" in the XML document 1110, the translator 1126 in the MCU shell 1120 corresponds to the resource "t2" in the XML document 1110, etc.

Figure 12:
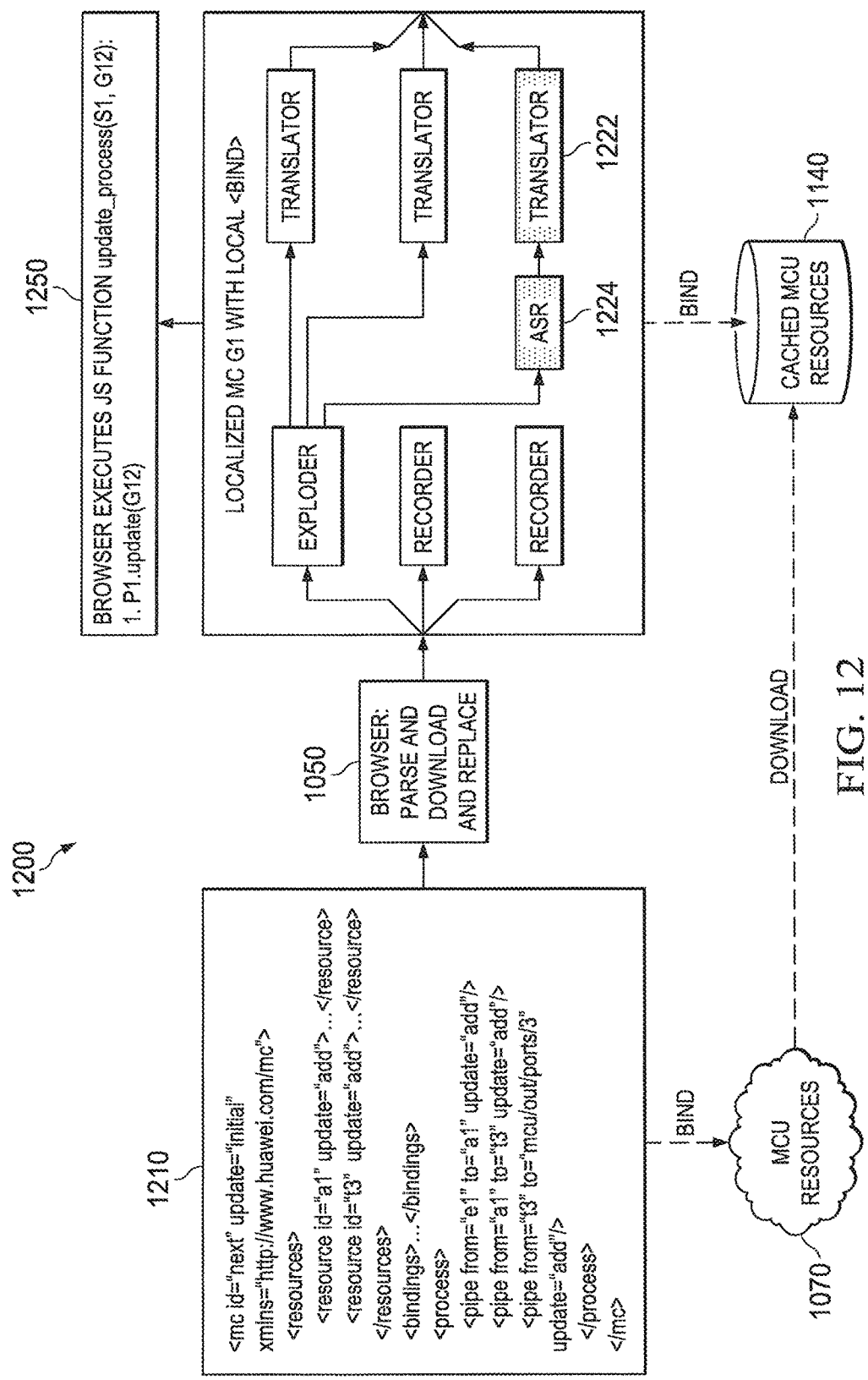
FIG. 12 illustrates an example of updating an MCU process from XML according to one embodiment.

FIG. 12 illustrates an example of updating an MCU process from XML, and in particular, updating a process within an MCU 1220. As illustrated, two "new" resources (identified by "a1" and "t3" in the XML document 1210) are going to be added to the process. For example, as illustrated, a new resource "a1" is defined in the <resources> element as <resource id="a1" update="add"> . . . </resource>. Similarly, a new resource "t3" is defined in the <resources> element as <resource id="t3" update="add"> . . . </resource>.

Thereafter, the browser 1050 receives the XML document 1210, parses the XML document 1210, tries to find matching resources, and downloads the concrete resources from the web. The resources are downloaded into the MCU cache 1140 from the repository (e.g., MCU resources 1070). Once the download succeeds, the browser 1050 executes a Java script function 1250 to update these processes within the MCU shell 1220. For example, the translator 1222 in the MCU shell 1220 corresponds to the new resource "t3" in the XML document 1210. Similarly, the speech recognition engine 1224 in the MCU shell 1220 corresponds to the new resource "a1" in the XML document 1110. As illustrated, the speech recognition engine 1224 and the translator module 1222 are the new resources that have been added to the MCU process illustrated in FIG. 11.

FIG. 13 illustrates an example of a table 1300 that may be used to describe services and functions of MCU components. In general, an MCU component can process a media stream at three levels—a raw (uncompressed) level 1302; a code (compressed) level 1304, and a packet (transport e.g., (RTP)) level 1306. Most media components (e.g., encoder, decoder, mixer, etc.) perform some functions at any of these three levels.

The way media components process media streams also is finite. In general, there are four operations for any media stream at any of the three levels described above: (1) explode 1310—takes a stream and makes a duplication of it; (2) merge same source 1320—merge stream from the same source; (3) merge different sources 1330—merge stream from different sources; and (4) translate 1340—changes format of the media stream. Based on this observation, any media component can be described in relation to what is input to the media component and what is output by the media component using the illustrated table. In addition, this allows for "type checking" of the MCU process where connectivity between components is checked to verify that the components are connected correctly and that the media types are compatible. If there is a misconnection, the MCU process may not work.

The following are examples of MCU components and how their function can be described in XML. It will be appreciated that more MCU components than those described below can be described in XML, JSON, or other alternative formats. For example, a selector resource, whose basic function is to select "N" sink streams from "M" source streams, may be described using the selector resource XML representation:

```
<selector id="c1">
    <source id="x" min="2" max="500">
        <type media_type="*" />
    </source>
    <sink id="y" min="1" max="100">
        <type media_type="*" />
    </sink>
    <constraints>x.ports = y.ports</constraints>
</selector>
```

As illustrated, the selector resource XML representation includes a "source" attribute to define the source, a "sink" attribute to define the sink, and a "media type" attribute to define the media type. A "constraints" attribute may be used to define the number of ports between the two components (e.g., source and sink).

A multicast resource, whose basic function is to duplicate one stream to "m" streams, may be described using the multicast resource XML representation:

```
<exploder id="c2">
    <source id="x" min="1" max="1">
        <type media_type="*" />
    </source>
    <sink id="y" min="2" max="100">
        <type media_type="*" />
    </sink>
    <constraints>x.type = y.type</constraints>
</exploder>
```

A switch resource, whose basic function is to rearrange "m" source streams into "m" sink streams, may be described using the switch resource XML representation:

```
<switch id="c3">
    <source id="x" min="1" max="100">
        <type media_type="*" />
    </source>
    <sink id="y" min="1" max="100">
        <type media_type="*" />
    </sink>
    <constraints>
        x.ports=y.ports AND x.type = y.type
    </constraints>
</switch>
```

A bundle resource, whose basic function is to compose multiple media frames of a source stream into a single packet in the sink stream (batch media frames), may be described using the bundle resource XML representation:

```
<bundle id="c4">
    <source id="x" min="1" max="1">
        <type media_type="raw" />
    </source >
    <sink id="y" min="1" max="1">
        <type media_type="raw" />
    </sink>
</bundle>
```

An unbundle resource, whose basic function is to decompose a single frame in the source stream into multiple frames in the sink stream, may be described using the unbundle resource XML representation:

```
<unbundle id="c5">
    <source id="x" min="1" max="1">
        <type media_type="raw" />
    </source >
    <sink id="y" min="1" max="1">
        <type media_type="raw" />
    </sink>
</unbundle>
```

A mixer resource, whose basic function is to compose frames from multiple source streams into a single frame in the sink stream in the decompressed domain, may be described using the mixer resource XML representation:

```
<mixer id="c6">
    <source id="x" min="2" max="100">
        <type media_type="raw" />
    </source>
    <sink id="y" min="1" max="1">
        <type media_type="raw" />
    </sink>
</mixer>
```

A transcoder resource, whose basic function is to change the encoding of the source stream to a different one, may be described using the transcoder resource XML representation:

```
<transcoder id="c7">
    <source id="x" min="1" max="1">
        <type media_type="code" />
    </source>
    <sink id="y" min="1" max="1">
        <type media_type="code" />
    </sink>
</transcoder>
```

A bridge resource, whose basic function is to change the transport (e.g., RTP/UDP/IPv4) of the source stream to a different transport (e.g., RTP/UDP/IPv6), may be described using the bridge resource XML representation:

```
<bridge id="c8">
    <source id="x" min="1" max="1">
        <type media_type="packet" />
    </source >
    <sink id="y" min="1" max="1">
        <type media_type="packet" />
    </sink>
    <constraints>
        x.type.transport != y.type.transport
    </constraints>
</bridge>
```

A decoder resource, whose basic function is to decode one stream, may be described using the decoder resource XML representation:

```
<decoder id="c9" type="Decoder">
    <source id="x" min="1" max="1">
        <type media_type="code" />
    </source>
    <sink id="y" min="1" max="1">
        <type media_type="raw" />
    </sink>
</decoder>
```

An encoder resource, whose basic function is to encode one stream, may be described using the encoder resource XML representation:

```
<encoder id="c10">
    <source id="x" min="1" max="1">
        <type media_type="raw" />
    </source>
    <sink id="y" min="1" max="1">
        <type media_type="code" />
    </sink>
</encoder>
```

A mux resource, whose basic function is to send "m" source streams to the same transport port, may be described using the mux resource XML representation:

```
<mux id="c11" type="Mux">
    <source id="x" min="2" max="100">
        <type media_type="*" />
    </source>
    <sink id="y" min="1" max="1">
        <type media_type="*" />
    </sink>
</mux>
```

FIG. 14 illustrates a flow diagram illustrating a method 1400 for constructing a multipoint control unit (MCU) process. The method 1400 includes generating an abstract multipoint control unit (MCU) process at an electronic device, the abstract MCU process comprising an identification of a plurality of MCU resources for instantiating the abstract MCU process at step 1402. For example, an electronic device can create a media process via the web browser 804 and deploy it through the MCU shell. A user of the electronic device can use the web browser 804 to define the process and to define the media components within the process.

The method 1400 includes transmitting, from the electronic device, the abstract MCU process to a server at step 1404. For example, once the media components are defined or identified, the user submits the abstract MCU process to the web server 808.

The method 1400 includes receiving, from the server in response to the transmitted abstract MCU process, a concrete MCU process at the electronic device, the concrete MCU process comprising the identified plurality of MCU resources, at step 1406. For example, with the abstract process information, the web server 808 searches for and identifies the requested resources or media components for the process and returns the requested resources with the process to the browser 804. Thereafter, the web browser 804 may parse the concrete process to determine concrete resource associations and download the defined resources.

In accordance with this disclosure, users can create customized MCU networks and processes using the MCU resources (e.g., building blocks) available on the web to reduce cost and increase performance of a prebuilt MCU with limited configuration options. In addition, an MCU resource cache can increase download performance for multiple MCU shells and isolate MCU shells from the web for security reasons. Further, the present disclosure supports a dynamic MCU process update without necessarily stopping the entire MCU process. In addition, the MCU processes can be shared between applications to save development cost.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for constructing a multipoint control unit (MCU), the method comprising:
   generating an abstract multipoint control unit (MCU) process at an electronic device, the abstract MCU process comprising an identification of a plurality of MCU resources for instantiating the abstract MCU process;

transmitting, from the electronic device, the abstract MCU process to a server; and receiving, from the server in response to the transmitted abstract MCU process, a concrete MCU process at the electronic device, the concrete MCU process comprising the identified plurality of MCU resources.

2. The method in accordance with claim 1, wherein the abstract MCU process further comprises defining how the MCU resources are to be interconnected within an MCU shell.

3. The method in accordance with claim 2, further comprising searching an MCU resource repository for the identified MCU resources, wherein the MCU resources comprise media components.

4. The method in accordance with claim 3, further comprising parsing the concrete MCU process to determine concrete resource associations.

5. The method in accordance with claim 4, further comprising:

determining whether the identified MCU resources are already within an MCU resource cache memory; and if the identified MCU resources are not already within the MCU resource cache memory, downloading the identified MCU resources to the MCU resource cache memory.

6. The method in accordance with claim 2, further comprising, if the identified MCU resources are already within the MCU resource cache memory, receiving cache locations of the identified MCU resources at the electronic device.

7. The method in accordance with claim 6, further comprising replacing existing cache locations of the identified MCU resources that correspond to the received cache locations of the identified MCU resources with the received cache locations of the identified MCU resources.

8. The method in accordance with claim 7, further comprising loading the identified MCU resources from the MCU resource cache memory by the MCU shell.

9. The method in accordance with claim 8, wherein generating the abstract MCU process comprises generating an updated abstract MCU process, the updated abstract MCU process comprising a difference between a previously generated first abstract MCU process and a second abstract MCU process.

10. An apparatus comprising:

a processor; and memory coupled to the processor;

wherein the apparatus is configured to:

generate an abstract multipoint control unit (MCU) process by a web browser of the apparatus, the abstract MCU process comprising MCU resources that will be needed to instantiate the abstract MCU process; and receive a concrete MCU process by the web browser of the apparatus, the concrete MCU process comprising the needed MCU resources.

11. The apparatus in accordance with claim 10, wherein the abstract MCU process further comprises defining how the MCU resources are to be interconnected within an MCU shell.

12. The apparatus in accordance with claim 11, wherein the apparatus is further configured to search an MCU resource repository for the needed MCU resources, wherein the MCU resources comprise media components.

13. The apparatus in accordance with claim 12, wherein the apparatus is further configured to parse the concrete MCU process to determine concrete resource associations.

14. The apparatus in accordance with claim 13, wherein the apparatus is further configured to:

determine whether the needed MCU resources are already within an MCU resource cache memory; and if the needed MCU resources are not already within the MCU resource cache memory, download the needed MCU resources to the MCU resource cache memory.

15. The apparatus in accordance with claim 14, wherein the apparatus is further configured to, if the needed MCU resources are already within the MCU resource cache memory, receive cache locations of the needed MCU resources by the web browser.

16. The apparatus in accordance with claim 15, wherein the apparatus is further configured to replace existing cache locations of the needed MCU resources that correspond to the received cache locations of the needed MCU resources with the received cache locations of the needed MCU resources.

17. The apparatus in accordance with claim 16, wherein the apparatus is further configured to load the needed MCU resources from the MCU resource cache memory by the MCU shell.

18. The apparatus in accordance with claim 17, wherein generating the abstract MCU process comprises generating an updated abstract MCU process, the updated abstract MCU process comprising a difference between a previously generated first abstract MCU process and a second abstract MCU process.

19. The apparatus in accordance with claim 10, wherein the apparatus is further configured to:

transmit the abstract MCU process to a web server coupled to the electronic device; and receive the concrete MCU process from the web server.

* * * * *